United States Patent [19]
Vollert et al.

[11] Patent Number: 5,208,858
[45] Date of Patent: May 4, 1993

[54] METHOD FOR ALLOCATING USEFUL DATA TO A SPECIFIC ORIGINATOR

[75] Inventors: Emmeran Vollert, Grosshoehenrain; Eberhard Wildgrube, Munich, both of Fed. Rep. of Germany

[73] Assignee: Siemens Aktiengesellschaft, Munich, Fed. Rep. of Germany

[21] Appl. No.: 645,496

[22] Filed: Jan. 24, 1991

[30] Foreign Application Priority Data

Feb. 5, 1990 [DE] Fed. Rep. of Germany ....... 4003386

[51] Int. Cl.⁵ .......................... H04L 9/02; H04K 1/00; H04K 9/00
[52] U.S. Cl. ........................................ 380/43; 380/21; 380/23; 380/28; 380/30; 380/42
[58] Field of Search ...................... 380/21, 23, 28, 30, 380/42, 43

[56] References Cited

U.S. PATENT DOCUMENTS

| | | | |
|---|---|---|---|
| 5,005,200 | 4/1991 | Fischer | 380/30 |
| 5,050,212 | 9/1991 | Dyson | 380/25 |
| 5,073,934 | 12/1991 | Matyas et al. | 380/30 |

OTHER PUBLICATIONS

R. L. Rivest et al., Comm. of ACM, Feb. 1978, vol. 21, #2, p. 120.
F. Schmidtke, HICOM Sicherheitskonzept, K PN EP 63, Aug. 1986.

*Primary Examiner*—Stephen C. Buczinski
*Attorney, Agent, or Firm*—Hill, Van Santen, Steadman & Simpson

[57] ABSTRACT

The hash result of useful data is transmitted to a multiply-protected central server in which it is transformed into a signature on the basis of a crypto operations system combination with a private key code of the originator. The signature is deposited in the central server and is available as what is referred to as a "digital signature" for the transmission of the useful data.

7 Claims, 2 Drawing Sheets

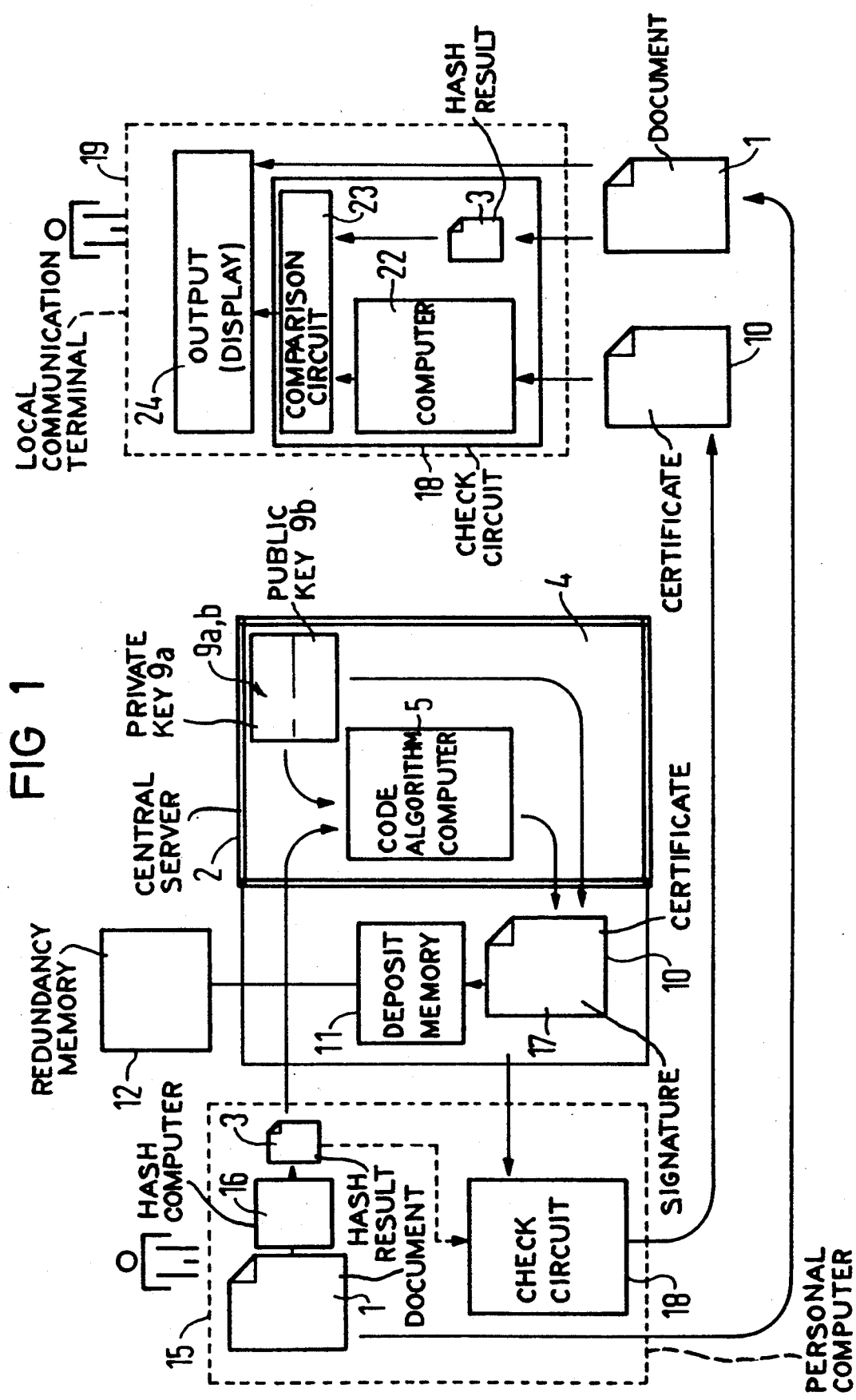

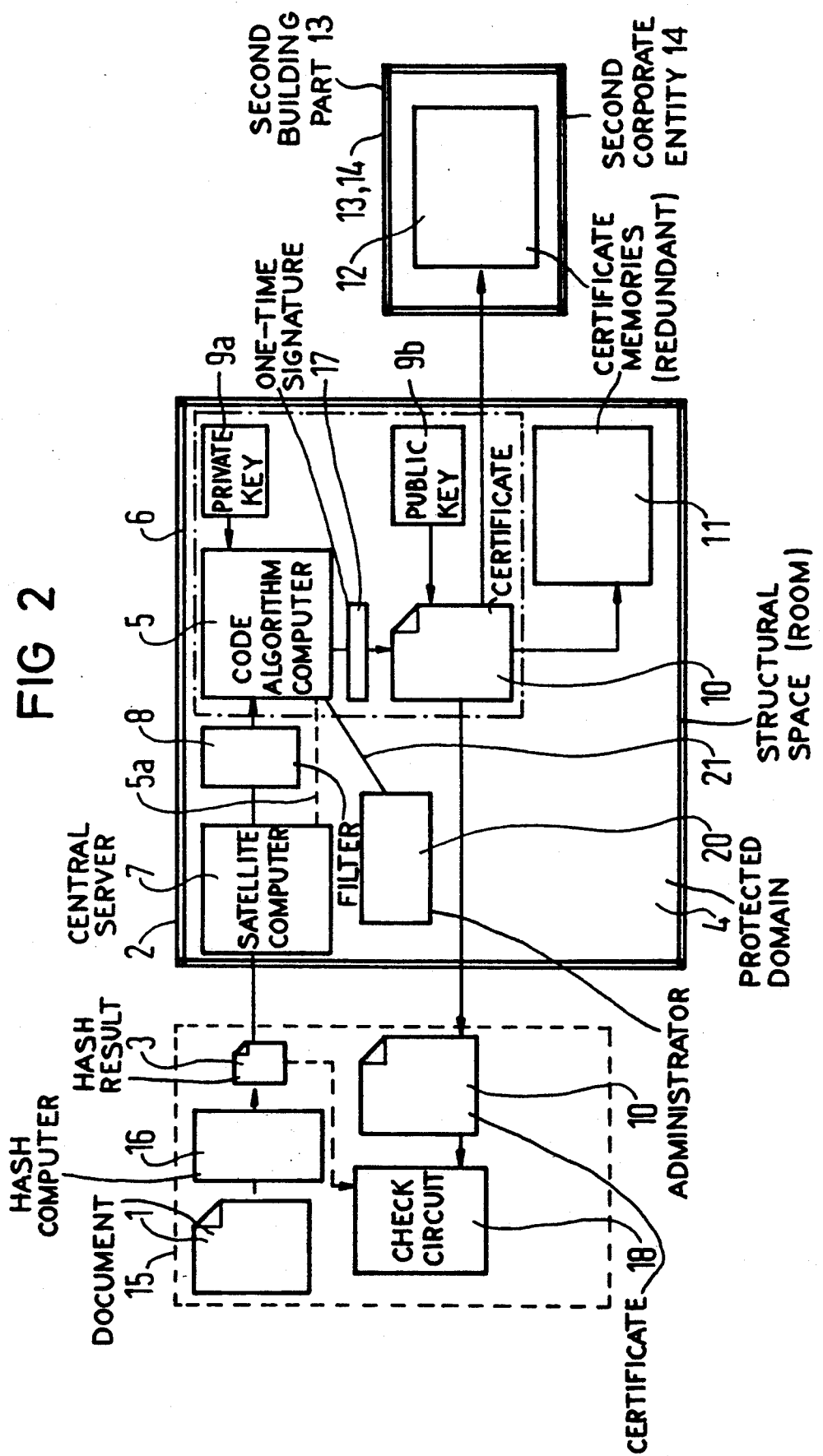

METHOD FOR ALLOCATING USEFUL DATA TO A SPECIFIC ORIGINATOR

BACKGROUND OF THE INVENTION

1. Field of the Invention

The present invention relates to a method for the unambiguous allocation of useful data transmitted between a first communication local end and a second communication local end to a specific originator, whereby a hash result that is subjected to a crypto algorithm is formed in addition to the useful data.

2. Description of the Prior Art

Methods of the type described above are also known in the art by the rubric of "electronic signatures". Generating an electronic signature is based on the utilization of an asymmetrical RSA transformation method. The information to be signed is thereby compressed to a fixed length according to a system-wide, public method, what is referred to as a hash method. The result of this compression is subsequently further processed with the private RSA code of the originator. For the output information transmitted in clear text, the signature can be verified at the receiver or at a special system entity, in that the production of the signature with the public key of the originator is reduplicated according to the same method. The authenticity of the document is checked by comparing the results. When the result of the check is positive, it is assured, first of all, that the document arrives from a specific originator and, secondly, that no further modification was undertaken after the signing of the document.

The production of such a digital signature in communication in networks previously occurred in the terminal equipment of the signatory. This is then referred to as a decentralized method. Only the pairs of codes employed are centrally generated and administered, whereby this involves a public key code and a private key code as a result of the asymmetrical coding method. Security problems arise in the manipulation of the private key code to be protected, particularly given the utilization of the known method with personal computers (PCs). The crypto methods being employed (for example, RSA) require a certain computer size, as a result whereof an accommodation in standardized processor chip cards presents technological difficulties at the present time.

A symmetrical code with processor chip cards has already been realized. However, an asymmetrical coding is better suited for networks because of the less-involved key management involved therewith. Here, also, however, the processor chip card technology has not yet been adequately developed.

At present, the utilization of the crypto algorithm for operating the digital signature therefore usually occurs within an apparatus separated from the PC. Since this apparatus is connected to the actual PC via a line, there is here the possibility of inadmissible manipulations.

A further disadvantage is comprised in that the personal key code of the user is located on his processor chip card and, therefore, the problem of protecting this card against unauthorized access arises.

SUMMARY OF THE INVENTION

It is an object of the present invention to provide a method of the type generally set forth above that is largely protected against manipulations as well as against unauthorized accesses and, in addition, offers the possibility of an independent monitoring for legally binding useful data sets in litigation.

According to the present invention, and in a method of the type mentioned above, this object is achieved in that the useful data are compressed with a hash method in the transmitting communication terminal and are subsequently communicated to a central server, in that the hash result, together with the private key of the user administered in the central server, is processed into a signature with a crypto algorithm after the successful authentification of the user, in that this signature is deposited in the central server and is transmitted simultaneously to the user for checking, together with the public key code of the user, that, given a positive result of the check, the useful data are transmitted to a second communication local end in clear text, together with the signature and with the public key, and in that the useful data received in clear text in the second communication local end are subjected to a hash method and the signature is subjected to a second crypto algorithm, inverse in comparison to the first, and that, given coincidence of the two results, a valid allocation of the useful data to a specific user is recognized.

In that the transformation of the hash result with the crypto algorithm in the method of the present invention does not occur until after the authentification of the user, occurring with the assistance of the private key code of the user, administered in the central server, manipulations on the transmission path of the useful data are prevented.

In that it is not the entire document that can also be very extensive that is sent to the receiver, an advantage of shorter transmission times occurs. Simultaneously, it is not the document content that is sent to the server but only a number, namely the hash result, from which the document cannot be reconstructed. With respect to personal data protection, this has an advantage for the acceptance of the digital signature.

Due to the deposit of the signatures in the central server, the individual signing procedures of various users can be documented, so that an independent monitoring possibility is here available for legally binding promises in litigation.

The German application 29 16 454 C3 discloses a circuit arrangement for checking the access authorization and for the protected transmission of information via unprotected transmission paths in telecommunication systems, whereby encoding and decoding equipment are provided at the beginning and at the end of transmission path. By contrast to the present method, the method for protecting transmission of information implemented with this circuit arrangement involves a symmetrical encoding method of the useful data to be transmitted in order to enable transactions between subscribers.

The method present herein does not involve transactions between two specific subscribers, but of the unilaterally-directed conveying of non-secret documents to an undefined number of receivers, whereby it should be assured that the allocation of the documents to a specific person is guaranteed with 100% reliability on the basis of the electronic or, respectively, digital signature.

In an advantageous feature of the method, the method of the present invention is characterized in that the user authentification occurs with a satellite computer lying in the transmission path preceding the crypto algorithm computer in combination with an electronic filter device, whereby the satellite computer is connected to the crypto algorithm computer via a separate control line. This guarantees an effective admission and access protection for the server with a simple electronic filter circuit that only allows data in the form of a hash value to pass. Documents infested with "viruses" and the like can therefore not proceed into the server process region at all. The coordination between the satellite computer and the crypto algorithm computer thereby occurs via a separate control line for security reasons.

The effectiveness of the user authentification can be increased, according to the present invention, in that biometric methods are employed.

According to another advantageous development and feature of the invention, the method is characterized in that the deposit of the signature in the central server occurs by at least doubling the deposit memory in separate structures. A certain protection of the deposited data against minor catastrophes is thereby established. A further advantageous development of the invention and a feature of the method is that the invention is characterized in that, due to the doubling of the signature deposit, the deposit can be administered on a long-term basis and mutually monitorable by different cooperate entities. For instance, a possible influencing or, respectively, manipulation by a single entity can thereby be prevented.

In order to facilitate potential argumentation, it is expedient that the deposit occurs immediately after the production of the signature and in chronological sequence.

Another advantageous development and feature of the method of the invention is that the method is characterized in that the private key code and the public key code are generated and administered in the protected crypto algorithm computer, whereby the private key code is stored in a non-readable fashion and the administration equipment for the code utilizes an exclusive interface to the actual crypto-algorithm computer.

Private key codes must always be protected even when being processed in the crypto algorithm computer. As long as this protection cannot be guaranteed at the subscriber, for example for technological reasons as set forth above, it is advantageous to have the processing take place in the central code generating domain must be protected anyway.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a schematic diagram of the operational sequence of the method of the present invention; and FIG. 2 is a schematic representation of the structure of a central server having a crypto algorithm computer for the implementation of the method of the invention.

Referring to FIGS. 1 and 2, a PC 15 of a first, transmitting local communication end is illustrated. A useful data document 1 is produced in the PC 15. The document 1 is supplied to a hash computer 16 at whose output a hash result 3 is provided. The hash result 3 is sent to a central server 2. A signature 17 is formed in the central server 2 in a crypto algorithm computer 5 from the hash result 3 in combination with a private key code 9a of the user. The signature 17 is supplemented by the central server 2 with the public key code 9b and with further data for a certificate 10 that is therefore essentially composed of the signature and of the public key code. The certificate 10 is deposited in a deposit memory 11 and is simultaneously deposited in a second redundancy memory 12.

The certificate 10 is sent for checking to the transmitting, first local communication terminal where it is reviewed for its correctness in a check circuit 18. Given a positive check result, the user then sends the document, together with the certificate, to the corresponding recipients.

In FIG. 1, the recipient is the local second communication terminal 19. Like the first local communication terminal, the second local communication terminal has a check circuit 18 available thereat that shall be set forth in greater detail below. The document 1 received in clear text is subjected to the same hash method in the check circuit 18 as in the first local communication terminal. The result of this method is the hash result 3. Simultaneously, the certificate 10 is subjected to a second crypto or code algorithm in a computer 22, the second crypto or code algorithm being inverse in comparison to the first crypto or code algorithm applied in the central server 2. The two results are compared with one another in a comparison circuit 23 and a valid display occurs at the output of the comparison circuit 23.

No second hash event like that in the check circuit of the second local communication terminal occurs in the check circuit 18 of the first local communication terminal. On the contrary, the hash result 3 that is already present here is used for checking.

In the method of the present invention, therefore, the hash result of useful data to be transmitted is sent, with a header, to a central server 2. Since the useful data are compressed to a defined length as a result of the hash event, a shorter transmission time results. The hash result is transformed into a one-time signature 17 only in the central server 2 on the basis of the private key code of the user stored and administered in the central server 2.

FIG. 2 illustrates the structure of the central server 2 in greater detail. In the central server 2, the crypto or code algorithm computer 5 is preceded by the satellite computer 7 and by an electronic filter 8. These serve the purpose of authentification of the user after receiving the hash result 3. The hash result and the header are separated in the satellite computer 7 which identifies the originator, the receiver, and the nature and extent of the necessary processing on the basis of the header. The electronic filter 8 is constructed such that it allows only data in the form of a hash value to pass. An effective admission and access protection for the server is therefore guaranteed. For security reasons, the coordination between the satellite computer and the code algorithm computer, on the basis of the header, occurs via a separate control line 5a.

The overall central server 2 is located in a protected domain 4 that is surrounded by a structural space (room) protection 6. The administration of the code keys with the administrator 20 that is connected via an exclusive interface 21 to the code algorithm computer 5 also occurs within this protected, secure environment.

Since the dependability of the method of digital signature is highly dependent thereon that the private key code is protected, i.e. does not penetrate to the outside world in any case, it is more reliable to store the private key code where it is generated, i.e. in the central server 2. After the production of the certificate 10, the same is deposited in a first deposit memory 11 and in a second deposit memory 12. The second deposit memory 12 is thereby located in a secure region separate from the secure region 4 of the central server 2. This establishes protection of the deposited data against minor catastrophes. For security reasons, the certificate deposit memory involves media that can be written only once and cannot be modified without destruction.

Due to the redundancy of the certificate deposit, it is also possible to have the deposits administered monitorable fashion on a long-term basis and mutually by different cooperate entities, so that high reliability against inadmissible influencing and manipulation is established.

The central certificate deposit serves as proof for a deliberately (autograph)-initiated digital signature. As a result of a memory architecture having a gap-free, chronologically-successive registration of the certificates of different subscribers, this proof can also be brought to court, as needed. The protected certificate memory 11 or, respectively, 12 functions like an independent third party (functions as a notary with the difference that the complete content of a document is "open" to the public in the notary's office). This certificate deposit then serves as a prerequisite for the legal recognition of digital signatures.

The user of the transmitting local communication terminal defines the addresses of the recipients in the method of the present invention and these are allowed to subsequently request the certificate at any time. This particular is a constituent part of the certificate. For reasons of data protection, other parties must turn to the signatory for subsequent requests for the certificate. The access of the recipients for "re-requesting the certificate" is monitored by the central server 2. This access is enabled by the central server 2 only after comparison to the particulars in the certificate.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A method for the unambiguous allocation of useful data transmitted between first and second local communication terminals to a specific originator, comprising the steps of:
   (a) compressing useful data with a hash method to form a hash result at a first local communication terminal;
   (b) transmitting a message including the hash result and a header identifying the originator, the receiver and the nature and extent of further processing to a central server;
   (c) processing the data for forwarding in the central processor by
      (c1) biometrically authenticating the user on the basis of the header, and
      (c2) forming a signature by processing the hash result and a private key code of the user with a first crypto-algorithm;
   (d) storing the signature in the central server;
   (e) transmitting the signature and the public key code of the user to the user for checking;
   (f) checking the signature and the public key code of the user at the first local communication terminal;
   (g) in response to a positive result of the check, transmitting the useful data, in clear text, and the signature to the second local communication terminal;
   (h) receiving the clear text useful data and the signature at the second local communication terminal;
   (i) applying the same hash method to the received clear text data to obtain the same hash result;
   (j) applying a second crypto-algorithm which is the inverse of the first crypto-algorithm to the signature;
   (k) comparing the results of the steps (i) and (j); and
   (l) in response to coincidence in the step (k), indicating a valid allocation of the useful data to the specific user.

2. The method of claim 1, wherein:
   the step (d) of storing the signature is performed immediately and in chronological sequence after the step (c2) of forming the signature.

3. The method of claim 1, wherein the step (d) of storing the signature is further defined as:
   (d1) storing the signature twice, each in a separate physical location.

4. The method of claim 3, wherein the step (d1) of storing the signature twice is further defined as:
   (d1a) storing the signature in a first memory located in a first building; and
   (d1b) storing the signature in a second memory located in a second building.

5. The method of claim 4, and further comprising the step of:
   (d1b1) monitoring and administering the signature stored in a second memory at the second building from a plurality of entities.

6. The method of claim 1, wherein the step (c) of preparing the data and the step (e) of transmitting the public key code are further defined as:
   (m) storing the private and public key codes in the central server, including storing the private key codes in a non-readable fashion; and
   (n) administering the private and public key codes via an exclusive interface to a crypto-algorithm computer.

7. A method for the unambiguous allocation of mutual data transmitted between first and second local communication terminals to a specific originator, comprising the steps of:
   (a) compressing useful data with a hash method to form a hash result at a first local communication terminal;
   (b) transmitting a message including the hash result and a header identifying the originator, the receiver and the nature and extent of further processing to a central server;
   (c) processing the data for forwarding in the central processor by
      (c1) authenticating the user with a satellite computer connected in front of a crypto algorithm computer;
      (c2) electronically filtering the message such that only the data of the hash result is permitted to pass to the crypto algorithm computer, and
      (c3) forming a signature by processing the hash result and a private key code of the user with a first crypto algorithm and the crypto algorithm computer while controlling the crypto algorithm computer over a separate control line with the electronic filter;
(d) storing the signature in the central server;
(e) transmitting the signature and a public key code of the user for checking;
(f) checking the signature and the public key code of the user at the first local communication terminal;
(g) in response to a positive result of the check, transmitting the useful data, in clear text, and the signature to the second local communication terminal;
(h) receiving the clear text useful data and the signature at the second local communication terminal;
(i) applying the same hash method to the received clear text data to obtain the same hash result;
(j) applying a second crypto algorithm which is the inverse of the first crypto algorithm to the signature;
(k) comparing the results of the steps (i) and (j); and
(l) in response to coincidence in the step (k), communicating a valid allocation of the useful data to the specific user.

* * * * *